Dec. 27, 1955  C. S. KELLEY  2,728,422
DISC BRAKE ROTOR
Filed May 19, 1950

INVENTOR.
Cecil S. Kelley
BY
Frank E. Miller,
ATTORNEY

United States Patent Office 2,728,422
Patented Dec. 27, 1955

2,728,422

DISC BRAKE ROTOR

Cecil S. Kelley, Forest Hills, Pa., assignor to Westinghouse Air Brake Company, a corporation of Pennsylvania Application May 19, 1950, Serial No. 162,877

5 Claims. (Cl. 188—264)

This invention relates to friction elements and more particularly to those employed as rotors in disc brakes.

The prime object of the present invention is to provide an improved friction element for use as a rotor in a disc brake of the type disclosed in United States application Serial No. 158,549, filed April 27, 1950, now Patent No. 2,687,786.

Other objects and advantages of the invention will become apparent from the following more detailed description thereof.

Figure 1:
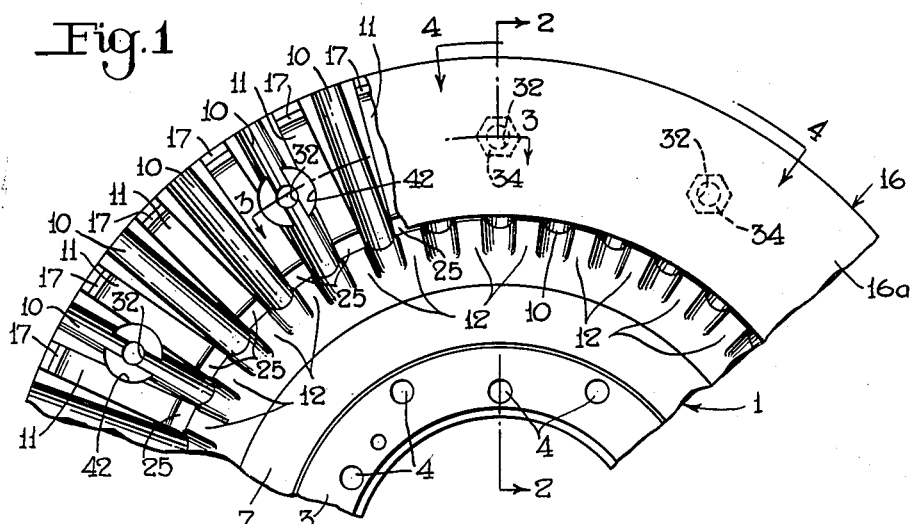
Figure 2:
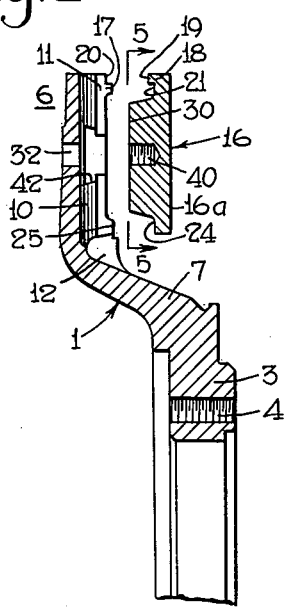
Figure 3:
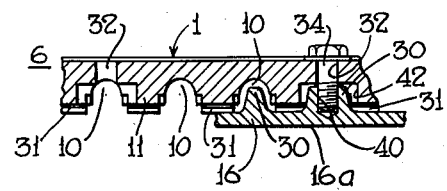
Figure 4:
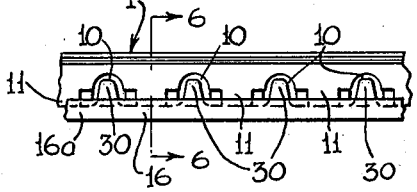
Figure 5:
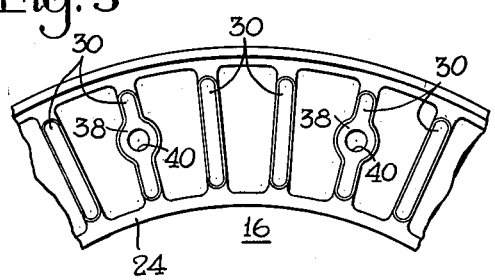
Figure 6:
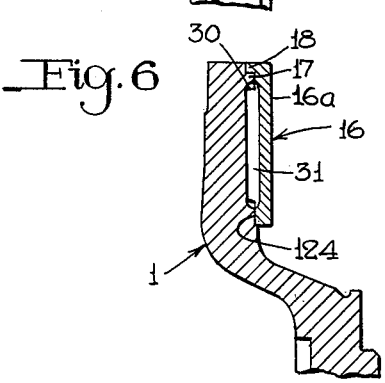

In the accompanying drawing: Fig. 1 is a face view of a segment of an annular disc brake rotor embodying the invention; Fig. 2 is an exploded cross-sectional view of the rotor as might be taken along the line 2—2 in Fig. 1; Fig. 3 is a cross-sectional view taken along the line 3—3 in Fig. 1; Fig. 4 is a view of the outer peripheral edge of the rotor taken along the line 4—4 in Fig. 1; Fig. 5 is a view of a rotor shoe taken along the line 5—5 in Fig. 2; and Fig. 6 is a cross-sectional view taken along the line 6—6 in Fig. 4.

Description

Referring to the drawing, the rotor embodying the invention comprises a continuous annular cast body 1 having an inwardly extending annular flange 3 which is provided with a plurality of bolt holes 4 to allow for securing the rotor to a railway vehicle wheel, or the like for rotation coaxially therewith. The flange 3 has a connection with an offset, parallel and coaxially arranged annular shoe mounting portion 6 of the rotor by means of an outwardly and axially extending continuous spoke 7 which is cast integral with said flange and shoe mounting portion and is curved to give rigidity and strength to such connection.

The annular shoe mounting portion 6 is provided at its inner annular face with a plurality of ventilating grooves 10 to allow for dissipation of heat generated during braking, as will hereinafter be described. These ventilating grooves 10 extend radially outward from the inner peripheral edge to the outer peripheral edge of the mounting portion 6 and divide the respective face of portion 6 into a plurality of circumferentially spaced apart integral segments 11. Intermediate each two adjacent grooves at the inner peripheral edge of the mounting portion 6 there is formed a web 12, which webs connect the integral segments 11 to the spoke 7 to impart strength and rigidity to such segments as well as to act as fan blades to urge air to flow radially outward therefrom into grooves 10 during rotation of the rotor.

To accommodate an annular brake shoe 16, having an outer annular braking surface 16a for frictional engagement with the usual brake stator (not shown), at the inner face of the mounting portion 6, each of the integral segments 11 is provided with a circumferentially curved locating rib 17, adjacent to but spaced a certain distance away from the outer edge, around which is adapted to fit a corresponding rib 18 of the removable annular brake shoe 16 to assure alignment of the shoe coaxially with the body portion 1; each of the respective ribs 17 being coaxial with the body 1. When shoe 16 is fit in place on the body 1, an annular shoulder 19 at the projecting end of the rib 18 will seat on respective accommodating aligned shoulders 20 formed in the integral segments 11 at their outer peripheral edges while the projecting end of the rib 17 seats on an annular shoulder 21 inside rib 18 in shoe 16. At the inner peripheral edge of shoe 16, an annular shoulder 24 is provided for engagement with an aligned rib 25 formed in each of the segments 11 in the mounting portion 6 of body 1. The shoe 16 is further provided with a plurality of circumferentially spaced apart radially extending fins 30, equal in number to the number of ventilating grooves 10, which are adapted to project into these grooves with clearance to allow for air flow through the grooves. Such flow of air through the grooves 10, induced by webs 12 during rotation of the rotor, sweeps over the fins 30 disposed therein and dissipates sufficient heat from the shoe 16 during its frictional engagement with a brake stator as to prevent generation of excessive temperature in such shoe, thereby precluding cracking and warping of the braking surface 16a.

Referring to Figs. 3 and 6, with the shoe 16 secured into engagement with body 1 only at its inner and outer peripheral edges an annular air conducting passage 31 substantially the full width of the brake shoe is defined between the shoe and body which passage is open to the radial grooves 10 to aid in heat dissipation. To further aid in such dissipation of heat without sacrifice to wearing quality, the shoe 16 may be made of a highly wear resistant and highly heat conductive material, such as a beryllium copper alloy, for example.

A plurality of bores 32 circumferentially spaced apart radially equidistant from the axis of the body 1 are provided which open through in an axial direction from the outer face of mounting portion 6 of said body into certain of the grooves 10, every fourth groove, for example, to accommodate cap screws 34 for screw-threaded attachment with respective fins 30 to secure the shoe 16 to said mounting portion in position as aforedescribed. The respective fins 30 into which the cap screws 34 extend in attachment therewith are provided with an integrally formed enlarged portion 38 to allow for provision of a drilled and tapped opening 40 to accommodate the threaded end of the cap screws, and at each of the respective grooves 10 into which a bore 32 opens, the mounting portion 6 is provided with a counterbore 42 into which said enlarged portion 38 may project with clearance. By removal of the cap screws 34, the annular shoe 16 may easily be set free from the body 1 and just as easily secured in place on said body by insertion and tightening of such screws.

Summary

It will be seen from the foregoing that I have provided a novel, relatively simple, strong, and inexpensive disc brake rotor for use such as in railway braking service and which will not be subject to warping or cracking of the braking surface of the easily removable single annular shoe.

Having now described the invention, what I claim as new and desire to secure by Letters Patent, is:

1. A brake rotor comprising an annular body adapted to be secured for rotation with a shaft to be braked and having a plurality of circumferentially spaced apart radially extending grooves formed in one annular face thereof, an annular removable friction brake shoe carried by said body and having an annular braking surface on one face and a plurality of circumferentially spaced apart radially extending fins on an opposite face projecting axially into said grooves with complete clearance from said body, respectively, and removable means carried by said body holding said shoe in engagement with said body.

2. A brake rotor comprising an annular body adapted to be secured for rotation with a shaft to be braked and having formed in one annular face thereof a plurality of circumferentially spaced apart radially extending grooves and a plurality of integral webs between adjacent grooves at the inner peripheral edge of said one annular face, an annular removable friction brake shoe carried by said body and having a braking surface on one annular face and a plurality of circumferentially spaced apart radially extending fins formed in the opposite annular face projecting axially into said grooves with complete clearance from said body, respectively, and removable means carried by said body holding said brake shoe in engagement with said body.

3. A brake rotor comprising an annular body having formed in one annular face a plurality of circumferentially spaced apart, radially extending grooves dividing said face into a plurality of integral segments each of which is provided with an aligned locating rib coaxial with said body, an annular brake shoe having a braking surface on one side and on its opposite side a plurality of circumferentially spaced apart radially extending integral fins projecting with clearance into said grooves, respectively, and an annular locating rib fit around the aligned locating ribs on said body to assure proper alignment of said shoe thereon, and a plurality of removable means securing said shoe to said body.

4. A brake rotor comprising an annular body having formed in one annular face a plurality of circumferentially spaced apart, radially extending grooves dividing said face into a plurality of integral segments each of which is provided with an aligned locating rib disposed coaxially with said body and a web at the inner peripheral edge of said body to urge air to flow into adjacent grooves during rotation of said rotor, an annular brake shoe having a braking surface on one side and on its opposite side an annular coaxial rib fit around the aligned ribs on said body and a plurality of circumferentially spaced apart radial fins projecting with clearance into said grooves, respectively, and a plurality of cap screws extending from an opposite face of said annular body through certain of said grooves and into screw-threaded attachment with respective certain of said fins, the respective fins and grooves being enlarged at vicinity of attachment to accommodate said cap screws.

5. A brake rotor comprising an annular body having formed in one annular face a plurality of circumferentially spaced apart radial grooves extending from inner to outer peripheral edges of said body dividing said face into a plurality of integral segments each of which is provided with a web at the inner peripheral edge of said body between adjacent grooves to urge flow of air radially outward through said grooves during rotation of said body, an annular brake shoe removably secured to said body in abutting relationship with said segments adjacent to the inner and outer peripheral edges of said body and otherwise spaced away therefrom, said shoe having formed therein a plurality of circumferentially spaced apart radial fins projecting with clearance into said grooves, respectively.

References Cited in the file of this patent

UNITED STATES PATENTS

| 715,111 | Miller | Dec. 2, 1902 |
| 880,266 | Ast | Feb. 25, 1908 |
| 2,024,328 | Batie | Dec. 17, 1935 |
| 2,503,704 | Bessiere | Apr. 11, 1950 |